June 8, 1926.
P. McLAUGHLIN
1,587,538
MEASURING ICE CREAM DISHER
Filed April 18, 1924    3 Sheets-Sheet 2
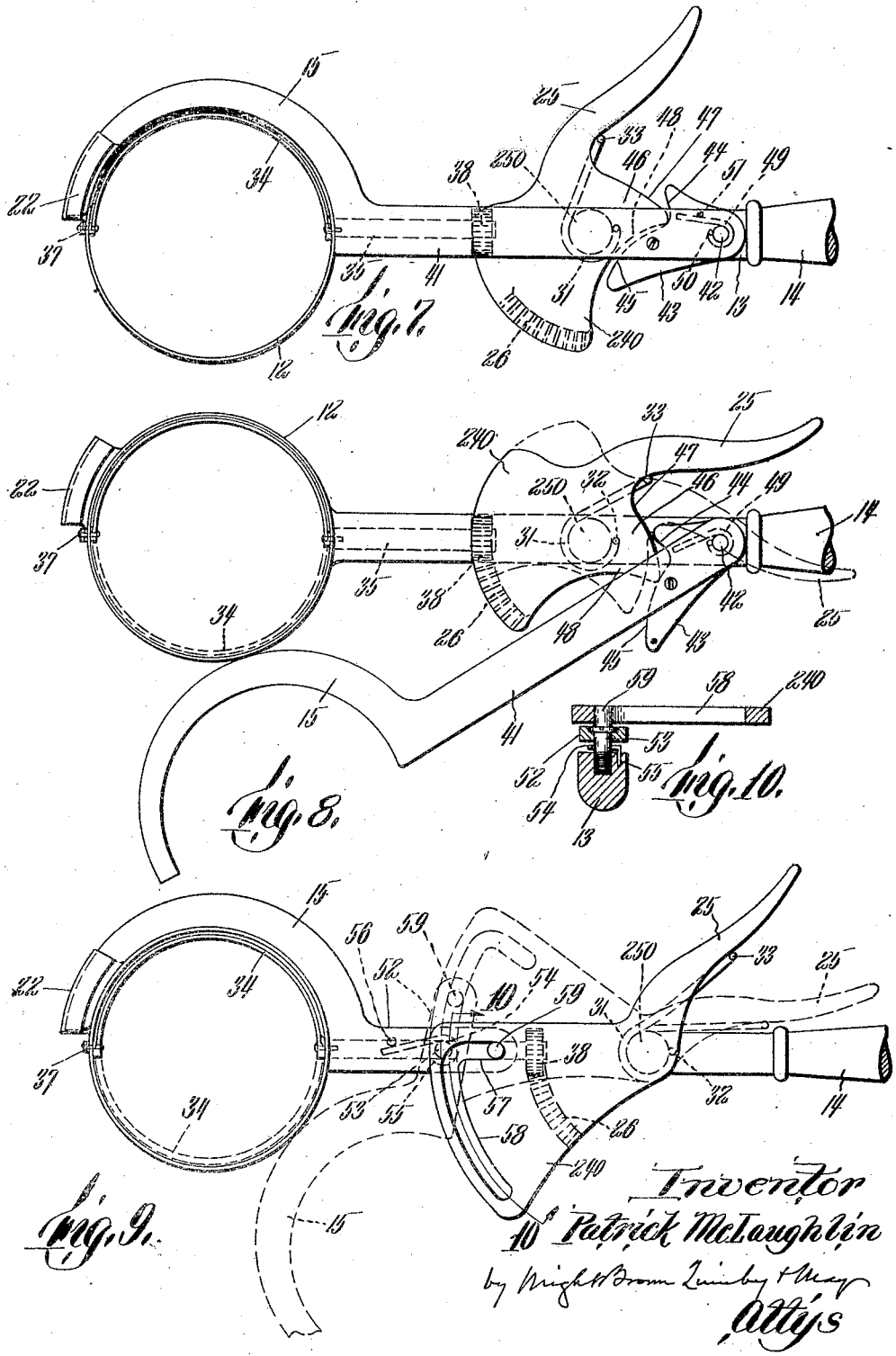
Inventor
Patrick McLaughlin
by Wright Brown Quimby & May
attys

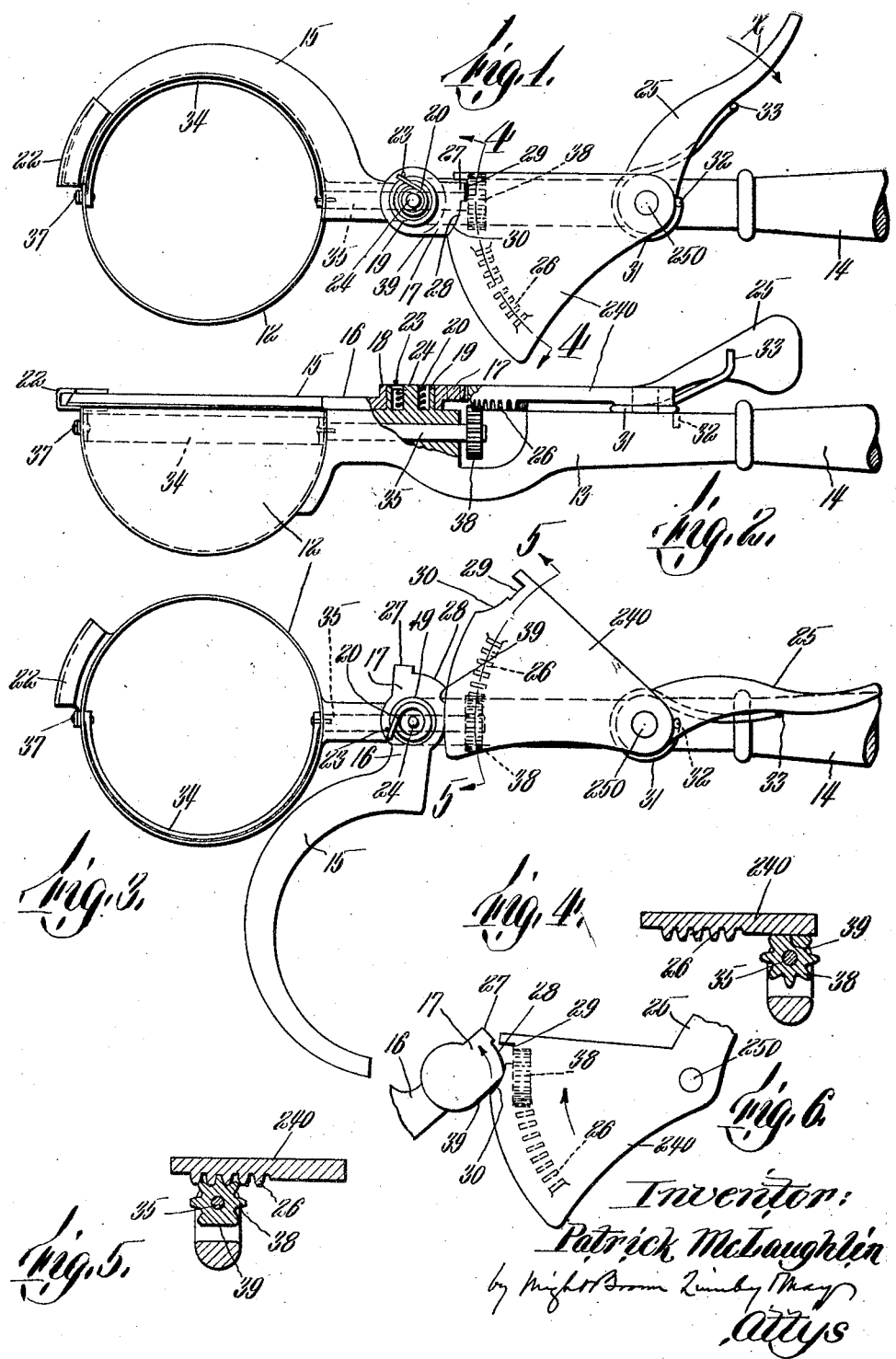

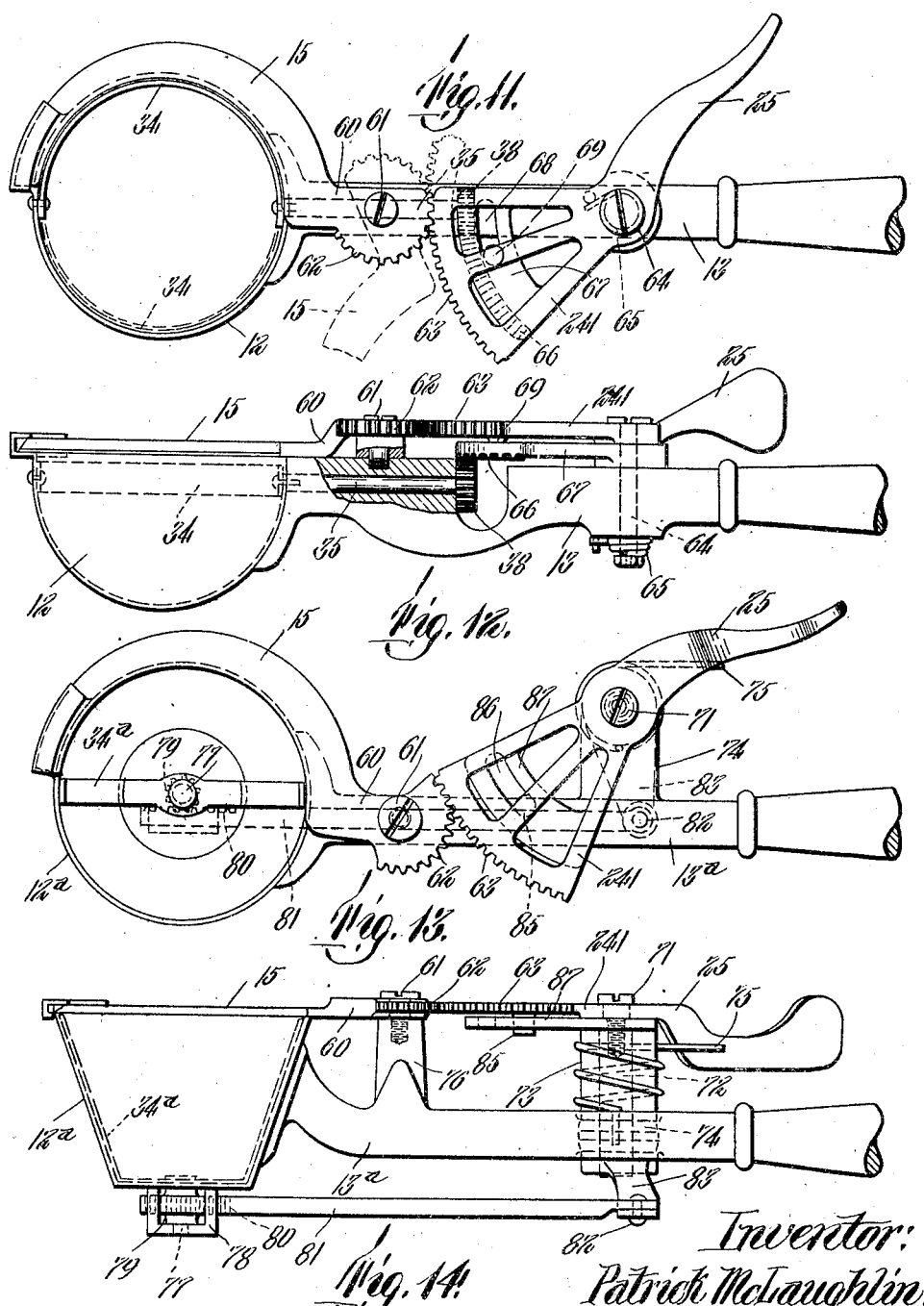

Patented June 8, 1926.

1,587,538

UNITED STATES PATENT OFFICE.

PATRICK McLAUGHLIN, OF DOVER, NEW HAMPSHIRE, ASSIGNOR TO GEORGE E. HOLMES AND FRANK W. GRANT, BOTH OF DOVER, NEW HAMPSHIRE.

MEASURING ICE-CREAM DISHER.

Application filed April 18, 1924. Serial No. 707,421.

This invention relates to an ice-cream disher which comprises a bowl or spoon having a shank, an operating lever fulcrumed on the shank, a cleaver movable by the operating lever across the mouth of the bowl to level a charge of cream thereon, and a scraper movable within the bowl by the operating lever, to detach the charge from the bottom of the bowl preparatory to dumping the charge.

The chief object of the invention is to provide means whereby a single movement of the operating lever causes the cleaver and scraper to perform their functions successively, to such an extent that the cleaver moves in advance of the scraper and levels the charge before it is outwardly displaced by the action of the scraper, the charge being dropped from the bowl before the retraction of the cleaver, so that such retraction is not obstructed by the charge which, when soft and sticky, offers a considerable resistance to the retraction of the cleaver to its starting position.

Of the accompanying drawings forming a part of this specification,—

Figure 1 is a top plan view, showing the preferred embodiment of the invention, the operating lever, the cleaver, and the scraper being retracted.

Figure 2 is an edge view, parts being shown in section.

Figure 3 is a view similar to Figure 1, showing the operating lever, the cleaver and the scraper projected.

Figure 4 is a section on line 4—4 of Figure 1.

Figure 5 is a section on line 5—5 of Figure 3.

Figure 6 is a fragmentary view similar to a portion of Figure 1, showing the operating lever and the cleaver partly projected.

Figures 7 and 8 are views similar, respectively, to Figures 1 and 3, showing modifications.

Figure 9 is a view similar to Figure 1, showing other modifications.

Figure 10 is a section on line 10—10 of Figure 9.

Figures 11, 12, 13 and 14 show in plan and side elevation two other modifications.

The same reference characters indicate the same parts in all of the figures.

Referring first to Figures 1 to 6, inclusive, 12 designates a preferably hemispherical dishing bowl or spoon fixed to a shank 13, having a handle 14. 15 designates a sickle-shaped cleaver, adapted to sweep across the mouth of the bowl and remove surplus material from a charge of ice-cream collected by the bowl. The cleaver is formed on a short shank, including portions 16 and 17, and an intermediate hub 18, adapted to turn on a bearing 19, fixed to and projecting from the bowl shank 13.

A torsion spring 20, normally holds the cleaver in the retracted position shown by Figure 1, against a combined stop and guard 22, on the bowl, one end of said spring being fixed to the bowl shank and the other end bearing on a stud 23, fixed to the hub 117 of the cleaver shank. In this instance the spring 20 is coiled on a fixed stud 24, within the bearing 19, the latter being tubular.

A manually movable operating lever, composed of arms 24 and 25, is fulcrumed at 250 on the bowl shank. The arm 24 has an arcuate outer end and is provided on its under side with an arcuate rack 26. The arm 25 is normally held by a spring, as hereinafter described, in the retracted position shown by Figure 1, and is formed and arranged to be pressed by a digit of the operator's hand, to move the cleaver to the projected position shown by Figure 3.

The cleaver shank portion 17 is provided with a tooth 27 and with an outwardly curved edge face 28, formed and arranged to bear respectively in a notch 29 and on an inwardly curved edge face 30 on the lever 24, as shown by Figure 1, when the operating lever and the cleaver are retracted.

A torsion spring 31, fixed at 32 to the bowl shank and bearing at 33 on the lever arm 25, normally holds the operating lever with its arms retracted, as shown by Figure 1.

34 designates a scraper conforming to the internal surface of the bowl and movable from the retracted position shown by Figure 1, to the projected position shown by Figure 3, to release a charge of ice-cream from the bowl preparatory to the dumping of the charge. One end of the scraper is fixed to a rock-shaft 35, journaled in a bearing in the bowl shank, and its opposite end is provided with a trunnion 37, journaled in a bearing in the bowl. The shaft 35 is provided with a pinion 38, meshing with the rack 26, said pinion being incomplete and provided with a face 39, which bears on the under side of the lever arm 24, as shown by Figure 4, and confines the pinion and the scraper shaft against rotation when the parts are in the relative positions shown by Figure 1, the rack 26 being separated from the pinion.

When the lever arm 25 is manually moved in the direction of the arrow X (Figure 1), the engagement of the arm 24 with the cleaver shank portion 17, caused by the edge faces 28 and 30, the notch 29 and the tooth 27, swings the cleaver partly to its projected position shown by Figure 3, just before the rack 26 engages the pinion 38. Thereafter, and while the rack is rotating the pinion to project the scraper, the projection of the cleaver is completed by the bearing of the edge face 30, on an edge face 39, on the scraper shank portion 17, as shown by Figure 6. When the cleaver is fully projected, the edge face 39 bears on the arcuate end of the lever arm 24 as shown by Figure 3, so that the cleaver is confined in its projected position. When the lever arm 25 is released, the operating lever is retracted or returned to its starting position by the spring 31, and the cleaver is at the same time retracted by the spring 20, the lever arm 24 and the cleaver shank portion 17 being thus again interengaged.

It will now be seen that the projecting movement of the operating lever successively projects the cleaver and the scraper, and that when the operating lever is released and retracted by its spring, the cleaver and the scraper are simultaneously retracted.

In the embodiment of the invention shown by Figures 7 and 8, the cleaver is provided with an elongated shank 41, adapted to swing on a fixed pivot study 42, on the bowl shank 13. To the shank 41 is fixed a cam-shaped member 43, having a recess formed by edge faces 44 and 45. On the operating lever is formed a projection 46, which enters said recess, as shown by Figure 7, when the operating lever and the cleaver are retracted, said projection having edge faces 47 and 48. The arrangement is such that the first part of the projecting movement of the operating lever projects the cleaver and engages the rack 26 with the pinion 38. During the remaining part of the projection of the operating lever to the dotted line position (Figure 8), the cleaver is confined in its projected position by the bearing of the edge face 47 on the edge face 44, and the scraper is projected by the rack and pinion.

When the operating lever is released, it is retracted by the spring 31, and the cleaver and the scraper are at the same time retracted, the cleaver being retracted by a torsion spring 49, supported by the pivot studs 42, and having an end portion fixed at 50, and an opposite end portion bearing on a stud 51 on the member 43. The scraper is retracted by the rack and pinion, as in the example first described.

In the modification shown by Figures 9 and 10, the cleaver is provided with a shank 52, adapted to swing on a pivot stud 53, fixed as shown by Figure 10, to the bowl shank 13. One end 55 of a spring 54 is fixed to the bowl shank, and its other end bears on a stud 56, on the cleaver shank, as shown by dotted lines in Figure 9, the spring normally holding the cleaver in its retracted position. The arm 24 of the operating lever has a slot composed of a straight portion 57, and an arcuate portion 58 concentric with the axis of the lever. The shank 52 has a stud 59 entering the slot. The arrangement is such that when the operating lever is retracted, as shown by full lines in Figure 9, the stud 59 is in the slot portion 57, and the cleaver is retracted. When the lever is being projected to the dotted line position, the slot portion 57 cooperates with the stud 59 in projecting the cleaver, the stud 59 sliding in the slot portion 57.

When the stud reaches the slot portion 58, it is confined motionless therein, so that the cleaver is held in its projected position, while the scraper is being projected by the rack 26 and pinion 38.

When the operating lever is released and retracted by the spring 31, the cleaver and scraper are at the same time retracted, respectively, by the spring 54 and by the rack and pinion.

It will now be seen that each of the described embodiments of the invention includes torque-transmitting connections between the operating lever and the cleaver 15, which I call the primary connections, these being operable during the initial projection of the lever to project the cleaver, confining means operable during the latter part of the projection of the lever to briefly confine the cleaver in its projected position, and torque-transmitting connections between the lever and the scraper 34, which I call the secondary connections, these being also operable during the latter part of the projection of the lever and before the retraction of the cleaver, to confine the cleaver in its projected position. Provision is therefore made for projecting the cleaver in advance of the scraper, and for holding the cleaver fully projected while the scraper is performing its function, so that a charge is released and discharged from the bowl before the retraction of the cleaver and an unobstructed retraction of the cleaver is permitted.

The said primary connections may be called one-way connections because they coact only in projecting the cleaver. When the cleaver is confined in its projected position by the confining means, the one-way connections are inoperative until the cleaver-retracting spring acts to retract the cleaver, this spring acting also to render the one-way connections operative. The connections between the operating lever and the scraper coact in both projecting and retracting the scraper and may therefore be called two-way connections.

I am enabled by the confining means to arrest the cleaver when it is projected to barely clear the bowl as shown by Figures 3 and 8.

The confining means may be omitted as in the modifications shown by Figures 11 to 14, which disclose cleaver-projecting means permitting a more extended projection of the cleaver, the scraper being projected during the latter part of the projection of the cleaver, so that a charge is released and discharged from the bowl before the retraction of the cleaver and an unobstructed retraction of the cleaver is permitted.

In the embodiment shown by Figures 11 and 12, the cleaver has a short shank 60 pivoted at 61 to the bowl shank, and provided with a gear segment 62 meshing with a gear segment 63 on the arm 241 of the operating lever. In this instance the operating lever is fixed to a stud 64 journaled in a bearing in the bowl shank 13, the lever being held in its retracted position by a spring 65 engaged at one end with the bowl shank and at the other end with the stud 64. Provision is thus made for imparting to the cleaver oscillating movements of sufficient amplitude to carry the cleaver to the position shown by dotted lines in Figure 11 when fully projected.

The pinion 38 on the scraper operating shaft 35 meshes with a rack 66 on an arm 67 which is adapted to turn on the stud 64 and is provided with a slot 68 receiving a stud 69 fixed to the lever arm 241.

The arrangement is such that when the operating lever is in its retracted position the stud 69 bears on one end of the slot 68 as shown by Figure 11, and acts through the arm 67, pinion 38, and shaft 35, to hold the scraper 34 retracted. When the operating lever is projected, the scraper remains at rest until the stud 69 bears on the opposite end of the slot 68, the arm 67 being then moved to cause the projection of the scraper. The projection of the cleaver is continued until the scraper has been fully projected, so that a charge is released and discharged from the bowl before the retraction of the cleaver and an unobstructed retraction of the cleaver is permitted. When the operating lever is released, the scraper remains briefly at rest in its projected position while the stud 69 moves from end to end of the slot 68 and is then retracted by the bearing of the stud on one end of the slot.

The features characterizing the invention may be used in a disher having a frusto-conical bowl 12$^a$ with a flat bottom, and a scraper 34$^a$ conforming to the bottom and tapering body of the bowl as shown by Figures 13 and 14.

In this embodiment the operating lever is adapted to turn on a screw fixed by a screw 71 to a stud or rock-shaft 72 journaled in a bearing 73 on an arm 74 projecting laterally from the bowl shank 13$^a$. The spring 75 which retracts the operating lever is engaged at one end with the arm 74 and at the other end with the lever arm 25. The cleaver shank 60 is pivoted at 61 to a post 76 on the bowl shank 13$^a$ and is provided with a gear segment 62 meshing with a gear segment 63 on the lever arm 241. The cleaver is therefore projected and retracted as in the embodiment shown by Figures 11 and 12. The scraper 34$^a$ is fixed to a short rock-shaft 77 journaled in bearings formed in the bottom of the bowl 12$^a$, and in a bracket 78 fixed to said bottom. The rock-shaft is provided with a pinion 79 meshing with rack teeth 80 on one end portion of a rod 81 which is slidable in guides in the bracket 78. The other end of the rod 81 is pivoted at 82 to an arm 83 fixed to the stud 72. The lever arm 241 is provided, as before, with a short stud 85 entering a slot 86 in an arm 87, which is fixed to the stud 72, the arm 87 being interposed between the bearing 73 and the hub portion of the operating lever as shown by Figure 14. When the operating lever is retracted the stud 85 bears on one end of the slot 86 as shown by Figure 13. The initial projection of the lever causes the stud to move to the other end of the slot before the arm 87 is moved. When the stud bears on the last mentioned end of the slot the arm 87 moves with the operating lever and turns the stud 72 to cause the arm 83 to move the rod 81 and project the scraper.

The secondary connections including the stud 69 or 85 carried by the operating lever and the slotted arm 67 or 87 cooperating with the stud, may be called lost motion connections because they permit limited initial movement of the operating lever and the cleaver without movement of the scraper. It will be seen that in each of the embodiments shown by Figures 11 to 14, the lever, the cleaver and the scraper are retracted by spring means embodied in a single spring engaged with the lever, and that in the embodiments shown by Figures 1 to 10 the lever, the cleaver and the scraper are retracted by spring means embodied in two springs, one engaged with the lever and the other with the cleaver.

Each of the embodiments shown comprises mechanism which normally holds the cleaver and the scraper retracted and is manually operable to cause the cleaver to move ahead of the scraper during the cleaving and scraping operations, and to remain projected until the charge has been released by the scraper and dropped from the bowl, so that an unobstructed retraction of the cleaver is permitted, said mechanism including a single oscillating operating lever fulcrumed on the bowl shank, primary torque-transmitting connections between the lever and the cleaver, operable during the initial projection of the lever to project the cleaver, secondary torque-transmitting connections between the lever and the scraper operable during the final projection of the lever to project the scraper, and resilient retracting means normally holding the lever, the cleaver and the scraper in their retracted positions.

The improved disher characterized by means for projecting the scraper while the cleaver is projected from the bowl, or in other words, to cause the cleaver to move ahead of the scraper during the cleaving and scraping operations, enables the operator to release the charge by the scraper and drop it from the bowl before the cleaver is retracted or returns to its starting position, so that the leveled surface of the charge is not in the path of the cleaver when the latter is being retracted. This is a matter of considerable importance in hot weather, when the cream is relatively soft and sticky, the leveled surface of a charge of sticky cream, raised slightly from the bowl by the scraper, and allowed to remain in the path of the returning cleaver, often so impedes the return of the cleaver that the return occupies ten seconds or more. This is true of the disher disclosed by the Holmes and Grant Patent 1,483,938, February 19, 1924. The mechanism of that patent is organized to instantly release and permit the retraction of the cleaver before the projection of the scraper, so that the cleaver in its return movement, contacts with the leveled surface of the charge and is considerably impeded thereby when the charge is soft and sticky.

My improved disher does not operate as rapidly as that of the patent above mentioned, when the cream is so hard that its leveled surface does not exert an appreciable drag on a cleaver returning in contact therewith to its starting point. My disher is intended primarily for use in hot weather and with sticky cream, and when used under these conditions, operates more rapidly than the disher of the above-mentioned patent.

I claim:

1. An ice cream disher comprising a bowl having a shank, an oscillatory cleaver movable across the mouth of the bowl, an oscillatory scraper movable within the bowl, and mechanism which normally holds the cleaver and scraper retracted and is manually operable to cause the cleaver to move ahead of the scraper during the cleaving and scraping operations, said mechanism including a single oscillatory operating lever fulcrumed on the bowl shank, primary torque-transmitting connections between the lever and the cleaver, operable during the initial projection of the lever to project the cleaver, secondary torque-transmitting connections between the lever and the scraper operable during the final projection of the lever and before the retraction of the cleaver to project the scraper, so that a charge is released and discharged from the bowl before the retraction of the cleaver and an unobstructed retraction of the cleaver is permitted, and resilient retracting means normally holding the lever, the cleaver and the scraper in their retracted positions.

2. An ice cream disher comprising a bowl having a shank, an oscillatory cleaver movable across the mouth of the bowl, an oscillatory scraper movable within the bowl, and mechanism which normally holds the cleaver and scraper retracted and is manually operable to cause the cleaver to move ahead of the scraper during the cleaving and scraping operations, said mechanism including a single oscillatory operating lever fulcrumed on the bowl shank, primary torque-transmitting connections between the lever and the cleaver, operable during the initial projection of the lever to project the cleaver, secondary torque-transmitting connections between the lever and the scraper operable during the final projection of the lever and before the retraction of the cleaver to project the scraper, so that a charge is released and discharged from the bowl before the retraction of the cleaver and an unobstructed retraction of the cleaver is permitted, and two retracting springs normally holding the lever, the cleaver and the scraper in their retracted positions, one of said springs being engaged with the lever and the other with the cleaver.

3. An ice cream disher comprising a bowl having a shank, an oscillatory cleaver movable across the mouth of the bowl, an oscillatory scraper movable within the bowl, and mechanism which normally holds the cleaver and scraper retracted and is manually operable to cause the cleaver to move ahead of the scraper during the cleaving and scraping operations, said mechanism including a single oscillatory operating lever fulcrumed on the bowl shank, primary torque-transmitting connections between the lever and the cleaver, operable during the initial projection of the lever to project the cleaver, secondary torque-transmitting connections between the lever and the scraper operable during the final projection of the lever to project the scraper, confining means operable during the final projection of the lever to positively confine the cleaver in its projected position during the projection of the scraper, so that a charge is released and discharged from the bowl before the retraction of the cleaver and an unobstructed retraction of the cleaver is permitted, and resilient retracting means normally holding the lever, the cleaver and the scraper in their retracted positions.

4. An ice cream disher comprising a bowl having a shank, an oscillatory cleaver movable across the mouth of the bowl, an oscillatory scraper movable within the bowl, and mechanism which normally holds the cleaver and scraper retracted and is manually operable to cause the cleaver to move ahead of the scraper during the cleaving and scraping operations, said mechanism including a single oscillatory operating lever fulcrumed on the bowl shank, primary torque-transmitting connections between the lever and the cleaver, operable during the initial projection of the lever to project the cleaver, secondary torque-transmitting connections between the lever and the scraper operable during the final projection of the lever to project the scraper, confining means operable during the final projection of the lever to positively confine the cleaver in its projected position during the projection of the scraper, so that a charge is released and discharged from the bowl before the retraction of the cleaver and an unobstructed retraction of the cleaver is permitted, a lever-retracting spring engaged with the lever, and a cleaver-retracting spring engaged with the cleaver, the said primary torque-transmitting connections being rendered operative by the action of the cleaver-retracting spring in retracting the cleaver.

5. An ice cream disher comprising a bowl having a shank, an oscillatory cleaver movable across the mouth of the bowl, an oscillatory scraper movable within the bowl, and mechanism normally holding the cleaver and scraper retracted and manually operable to cause the cleaver to move in advance of the scraper when said parts are performing their functions, said mechanism including a single oscillatory operating lever fulcrumed on the bowl shank, a spring normally retracting the lever, one-way torque-transmitting connections between the lever and the cleaver operable by the initial projection of the lever to project the cleaver, cleaver-confining means positively holding the cleaver projected during the final projection of the lever and during the projection of the scraper, so that a charge is released and discharged from the bowl before the retraction of the cleaver and an unobstructed retraction of the cleaver is permitted, two-way torque-transmitting connections between the lever and the scraper operable by the final projection of the lever to project the scraper and by the retraction of the lever to retract the scraper and a spring adapted to retract the cleaver and render said one-way connections operative to again project the cleaver.

6. An ice cream disher as specified by claim 3, the said primary connections being embodied in a recess and an inwardly curved edge face on the lever, and a projection and an outwardly curved edge face on the cleaver shank, the said confining means being embodied in an elongated edge face on the cleaver shank, and an arcuate end face on the lever slidable in contact with the said elongated edge face after the projection of the cleaver, to positively confine the cleaver in its projected position.

In testimony whereof I have affixed my signature.

PATRICK McLAUGHLIN.